United States Patent [19]

Jensen

[11] 4,344,785

[45] Aug. 17, 1982

[54] MODULAR MOLTEN GLASS COLUMN

[75] Inventor: Thomas H. Jensen, Murrysville, Pa.

[73] Assignee: PPG Industries, Inc., Pittsburgh, Pa.

[21] Appl. No.: 193,194

[22] Filed: Oct. 2, 1980

[51] Int. Cl.³ .......................................... C03B 37/025
[52] U.S. Cl. .............................................. 65/1; 65/12; 65/346
[58] Field of Search ............................ 65/1, 2, 12, 346

[56] References Cited

U.S. PATENT DOCUMENTS

| | | | |
|---|---|---|---|
| 3,574,581 | 4/1971 | Strickland et al. | 65/1 |
| 3,625,025 | 12/1971 | Jensen | 65/2 |
| 3,697,241 | 10/1972 | Strickland et al. | 65/2 |
| 3,733,188 | 5/1973 | Jensen | 65/2 |

FOREIGN PATENT DOCUMENTS

| | | | |
|---|---|---|---|
| 461908 | 6/1975 | U.S.S.R. | 65/12 |
| 649665 | 2/1979 | U.S.S.R. | 65/12 |

OTHER PUBLICATIONS

"The Manufacturing Technology of Continuous Glass Fibers" K. L. Loewenstein, Elsevier Scientific Publishing Company, New York, 1973 pp. 60-70.

Primary Examiner—Robert L. Lindsay, Jr.
Attorney, Agent, or Firm—John E. Curley

[57] ABSTRACT

A modular molten glass column comprised of a plurality of modular glass conduits for providing glass to, for example, a high pressure glass fiber forming bushing is disclosed. The column consists of several glass modules, each of which includes a glass conduit, a heating source for the conduit, insulation for the conduit, an outer protective cover, and connectors for joining the conduit module to other similar conduit modules, a glass melting forehearth, and a glass fiber forming bushing adapted to receive glass at elevated pressures and to form filaments therefrom. The modular molten glass column supplies molten glass to the bushing without requiring any pumps or the like. Furthermore, the glass column requires substantially less energy than conventional forehearths.

16 Claims, 4 Drawing Figures

MODULAR MOLTEN GLASS COLUMN

FIELD OF THE INVENTION

The present invention is directed generally to a modular molten glass column. More particularly, the present invention is directed to a modular molten glass column which can be utilized to deliver glass at an elevated pressure to a bushing. More specifically, the present invention is directed to a modular molten glass column for use in high pressure glass fiber forming. The modular molten glass column is comprised of one or more molten glass modules, each of which consists of a central glass conduit, typically cylindrical in shape, several surrounding layers of insulation and refractory material, a plurality of heating means such as electrical resistance heaters, and an outer shell. Each module is provided with suitable means to facilitate connection thereof to another module, to a glass fiber bushing assembly or to a forehearth which can supply molten glass to the column. The number of modules joined together to form the molten glass column can be varied depending on the pressure which is required by the bushing.

Description of the Prior Art

The formation of glass fibers from molten glass in which the glass is delivered to the forming bushing under pressure is known generally in the art. For example, U.S. Pat. Nos. 3,574,581; 3,625,025; 3,679,241; and 3,733,188 disclose various processes for producing glass filaments under pressure, these filaments are then coated with a size or binder, gathered into strand, and wound on a collet in known ways to produce glass fiber strands. These prior patents have required sophisticated and expensive pumps and pumping equipment to establish and maintain pressure heads across the glass fiber forming bushings. Since those pumps and associated pumping equipment come into contact with the molten glass which is at a temperature generally in the area of 2200° F., the pumps are fashioned from a noble metal such as platinum or platinum-rhodium alloy. Such equipment is very expensive, so expensive as to be essentially prohibitive for commercial use unless they can be operated for long periods of time with little or no maintenance. It has been found in the operation of these pumps and the associated pumping equipment in high temperature glass environments substantial maintenance problems and expenses have been incurred. When a pump requires maintenance or repair, the forming position must be shut down. Since the glass solidifies when the temperature is reduced, the maintenance of the equipment becomes even that much more of a problem.

While the concept of high pressure forming of glass filaments of small diameter and of forming of glass filaments of large diameters at high rates and with low winder tensions appears favorable in theory, it has not been utilized commercially to any large degree. The sophisticated equipment required to deliver the molten glass from the forehearth to the glass fiber forming bushings at a suitably high temperature and pressure has been expensive. Thus, high pressure glass fiber forming has not been adopted on a significant commercial scale.

SUMMARY OF THE INVENTION

It is an object of the present invention to provide a modular molten glass column.

Another object of the present invention is to provide a modular molten glass column to deliver glass at a high pressure to a forming bushing.

A further object of the present invention is to provide a modular molten glass column consisting of several glass conduit modules.

Yet another object of the present invention is to provide a modular molten glass column wherein the pressure of the glass delivered to the bushing can be both controlled and varied.

Still a further object of the present invention is to provide a modular molten glass column in which the amount of energy required to maintain a desired temperature of the glass is substantially reduced.

As will be set forth in greater detail in the description of a preferred embodiment as set forth hereinafter, the modular molten glass column in accordance with the present invention is comprised of a plurality of modular glass conduits which can be connected to each other, to a supply of molten glass and to a glass fiber forming bushing. The glass conduits may be generally cylindrical in cross section with an inner glass conducting pipe or tube which is unaffected by molten glass. Suitable insulation and refractory layers surround the tube and electric resistance heating means are attached. An outer covering is provided and each module is structured to be securable to another module, a glass forehearth, or a bushing assembly.

In the manufacture of glass fibers as practiced commercially today using a direct melt system as opposed to a marble melt operation, glass batch is fed to a melter or furnace and subjected to sufficient energy in the form of heat to melt the batch. Molten glass is then passed from the melter to a forehearth from which fiber glass forming bushings depend. The molten glass is then passed from the forehearth through the bushings located on the bottom thereof and flows by gravity through the bushing orifices to form glass fibers. This conventional system is described in the book "The Manufacturing Technology of Continuous Glass Fibres" by K. L. Loewenstein, 1973, Elsevier Scientific Publishing Co., N.Y. in particular on pages 60–70.

The modular molten glass column in accordance with the present invention can be secured to a conventional forehearth in place of the normal bushing. Molten glass is delivered to the column, is maintained at a desired temperature by the column, and is delivered at a high pressure to a forming bushing secured at a lower end of the column. The glass pressure at the bushing can be varied by adjusting the height of the column through addition or subtraction of modules.

The modular molten glass column in accordance with the present invention has no pumps or other such equipment and is virtually maintenance free. There are no moving parts and no equipment submerged in the molten glass. The molten glass contacts only the inner material in each glass conduit and this material is selected to be unaffected by the molten glass. Thus, the assembly in accordance with the present invention is suitable for commercial use because it is not extremely costly as are the prior devices, and it is essentially maintenance free so it does not require periodic shut down of the position for maintenance or repair.

The modular molten glass column in accordance with the present invention is securable to a known forehearth in place of a bushing. Thus, the production facility can use both high pressure and conventional forming bushing operating on the same forehearth, thereby increasing both the production and the flexibility of operation of a glass fiber forming forehearth. The modular molten glass column in accordance with the present invention is also appreciably more energy efficient than prior devices. The glass is carried in a closed, insulated conduit whose heat can be closely controlled. This is in marked contrast to conventional devices in which the glass is flowed through an open channel to the bushing. Hence, the energy required by the glass column is much less than prior devices.

The modular molten glass column in accordance with the present invention provides molten glass at high pressure to a glass fiber forming bushing. No expensive pumps or the like are required and the glass column needs significantly less energy than prior devices.

BRIEF DESCRIPTION OF THE DRAWINGS

While the novel features of the modular molten glass column in accordance with the present invention are set forth with particularity in the appended claims, a full and complete understanding of the invention may be had by referring to the description of a preferred embodiment as set forth hereinafter and as may be seen in the accompanying drawing figures in which:

DESCRIPTION OF A PREFERRED EMBODIMENT

Figure 1:
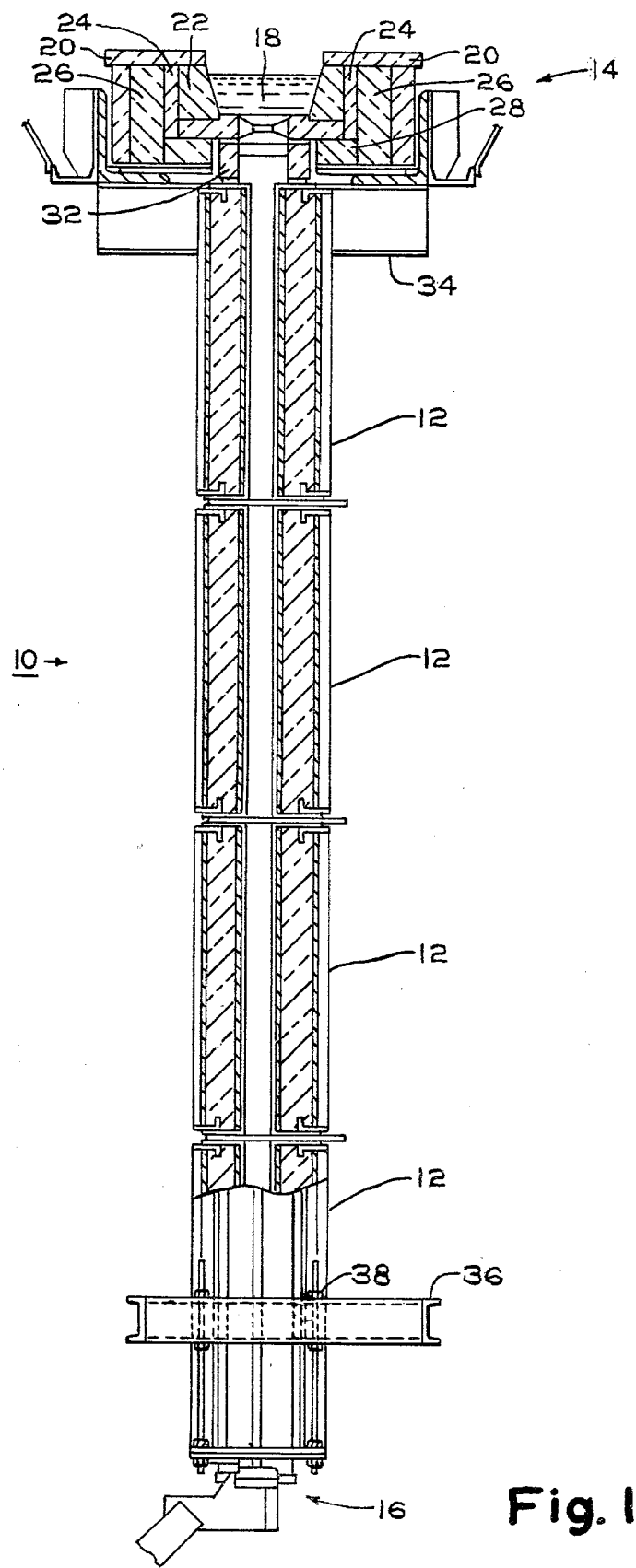
FIG. 1 is a side elevation view, partly in section, of a preferred embodiment of a modular molten glass column in accordance with the present invention.

Turning initially to FIG. 1, there may be seen generally at 10 a preferred embodiment of a modular molten glass column in accordance with the preferred embodiment. As may be seen, modular molten glass column 10 is comprised of a plurality of modular glass conduits 12 with, in the preferred embodiment, there being four such conduits 12 joined together to form column 10. While the preferred embodiment will hereinafter be described as having four conduits 12, it will be apparent that since each conduit 12 is the same as each other conduit, the specific number joined together to form column 10 will depend on the pressure of the glass desired to be delivered, from a forehearth assembly 14 at the top of column 10, to a high pressure glass fiber forming bushing 16 carried at the lower end of the lower most conduit 12.

Forehearth assembly 14 is generally conventional and contains molten glass 18 therein. Forehearth 14 is equipment with a cover 20 and sidewalls 22 that are backed by structural ceramic pieces 24 and 26. A flowblock 28 is located at the base of the sidewalls 22 and a central opening 30 is provided in the center of the flowblock 28. A vertical block 32 is positioned beneath central opening 30 and molten glass flows through central opening 30 and down a channel defined by vertical block 32 into the uppermost glass conduit module 12.

Column 10 is secured, at its upper end, to a structural member 34 which also supports the forehearth 14. A similar structural support 36 is provided near the lower end of column 10 and the column 10 is secured to these supports by suitable means such as bolts 38. Any suitable type of support can be used so long as the column 10 is satisfactorily supported. Advantageously, the lower end of column 10 will be located at such a height that the filaments formed by bushing 16 can then be directed to an applicator and then to a winder in a known manner.

Figure 2:
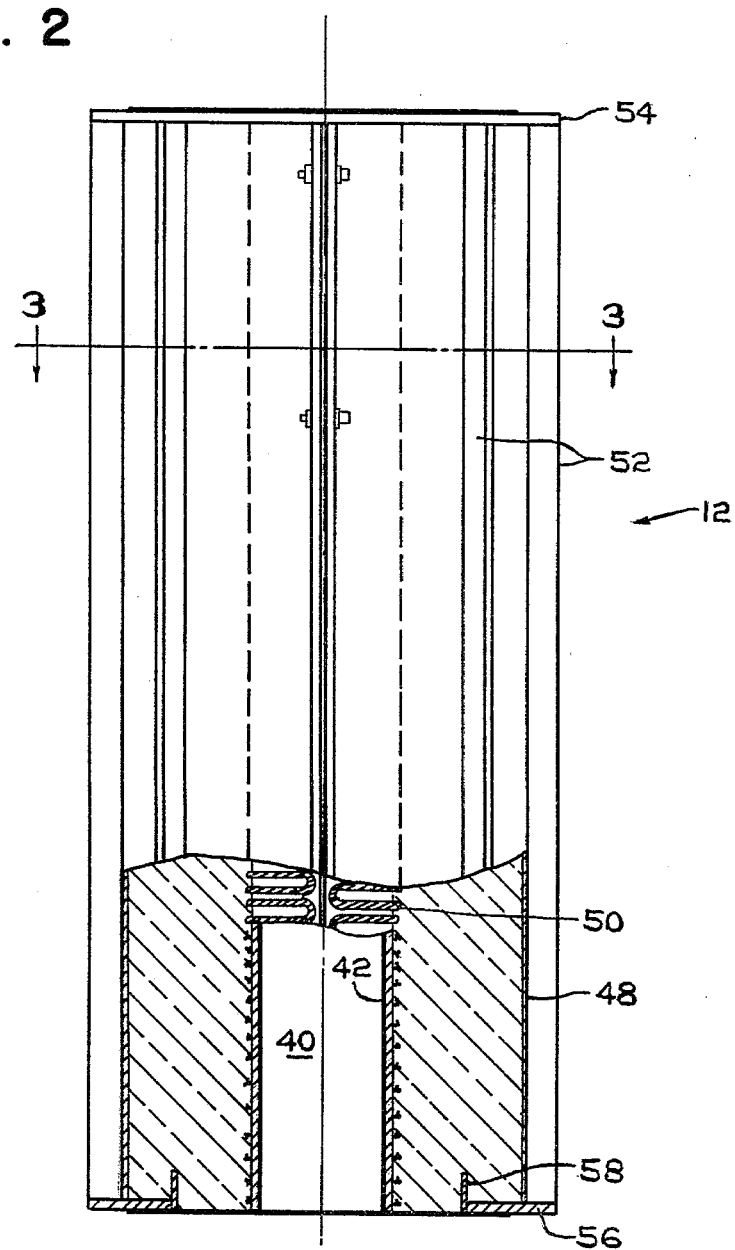
FIG. 2 is a side elevation view, partly in section, of one of the glass conduit modules of the modular column of the present invention.
Figure 3:
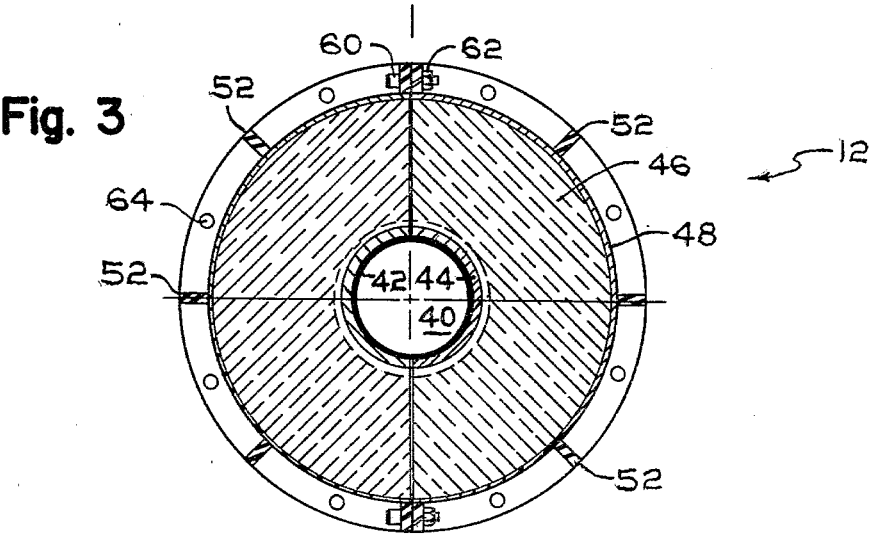
FIG. 3 is a cross-sectional view of the glass conduit module of FIG. 2, taken along line 3—3 in FIG. 2.

Turning now to FIGS. 2 and 3, there may be seen one of the modular glass conduits 12 which combine to form the modular molten glass column 10 of the present invention. The molten glass 18 flows into a central tube 40 of conduit 12 from forehearth 14. Tube 40 is defined by a liner 42 of platinum or platinum-rhodium alloy which is immediately surrounded by a concentric split ceramic liner 44, a split insulating castable material layer 46, and a split outer housing 48. A generally serpentine electric resistance heating element 50 is carried by each half of the ceramic liner 44, it being seen by referring to FIG. 3 that the platinum liner 42 is a single cylinder and that the ceramic liner 44, the insulating castable 46 and the outer shell 48 are all formed as cooperating semi-cylindrical elements to facilitate assembly of each modular glass conduit 12. It will further be seen by referring to FIGS. 2 and 3 that a plurality of outer fins 52 are formed on outer housing 50 and that these fins 52 are secured to upper and lower flanges 54 and 56, respectively which are embedded in the insulating castable 46. Flanges 54 and 56 are generally disk-shaped and carry upstanding projections 58 at their inner extremeties; projections 58 being held by the insulating castable 46 to securely join the flanges 54 and 56 to the conduit 12. Suitable bolts and nuts 60 and 62, respectively, are utilized along contacting fins 52 to join the two halves of the outer housing 48 together. Each of the flanges 54 and 56 are provided with spaced bolt holes 64 that are useable to join the various conduits 12 together and to facilitate attachment to the forehearth 14 and to the bushing 16.

In the preferred embodiment, the ceramic lining 44 is high purity alumina (McDaniel Ref. 998). The heating element is a braided, three wire element which is secured to the alumina liner 44 by a heating element cement (Norton EA-139), and connected to a suitable power source (not shown). The outer housing 48 is stainless steel and the castable refractory 46 is Norton CA-330. Suitable thermocouples (not shown) are applied for control purposes and their leads extend out between the two semi-cylindrical elements of the conduit 12. Each of the conduits 12 is, in the preferred embodiment, approximately 27 inches in length thus forming a modular molten glass column of approximately 9 feet in height which will deliver molten glass to bushing 16 at a pressure of approximately 10.5 psig. The column diameter and flow rate are such that pressure drops are of negligable magnitude.

Figure 4:
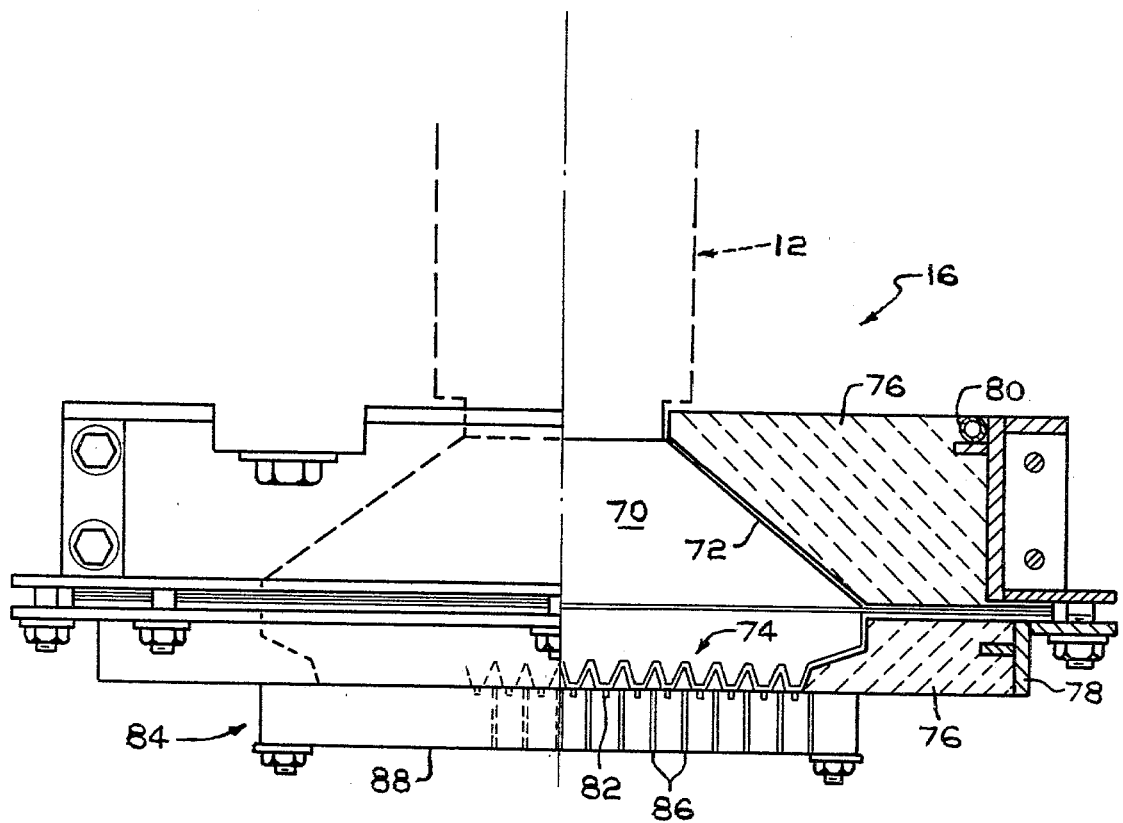
FIG. 4 is a front elevation view, partly in section, showing the attachment of a glass fiber forming bushing to the lower end of the modular molten glass column in accordance with the present invention.

Turning to FIG. 4, there may be seen a bushing, generally at 16, which is secured at the lower end of the lower glass conduit 12 by any suitable means. Bushing 16 is a high pressure glass fiber forming bushing having a supporting fin cooler. Suitable bushings for use in this invention are set forth in my co-pending U.S. Patent Applications Ser. Nos. 193,197 and 193,206 filed, Oct. 2, 1980. Bushing assembly 16 is generally comprised of a bushing 70 which includes inwardly sloping walls 72 and a tip plate 74. A castable refractory 76 surrounds bushing 70 and a frame 78 clamps the bushing 70 to any suitable support element. A suitable cooling coil 80 is also provided. Tip plate 74 is generally corrugated, as set forth in my above-identified patent application, and carries a number of spaced tips 82 through which the molten glass is passed to form the glass fiber filaments.

A fin cooler 84 is secured beneath the tip plate 74 of the bushing 70 and includes a group of spaced, plate-like fins 86 which extend across the bottom of tip plate 74 to cool the glass filaments and to support the tip plate, thus preventing it from being deformed by the high pressure glass being supplied to the bushing. As also discovered in my above-identified applications, fin cooler 84 may include one or more manifolds which can be supplied with coolant liquid and gas flow channels to effect cooling of the fins 86. The fins will contact the tip plate in a manner as discussed in my co-pending applications to adequately support the tip plate without having any adverse effect on the temperature pattern of the tip plate.

In use, a suitable number of modular glass conduits 12 are joined together to produce a modular molten glass column 10 of a desired height to supply molten glass from a forehearth 14 to a high pressure glass fiber forming bushing 16. The upper end of the column 10 is secured to the forehearth 14 and the lower end of the column 10 is provided with a bushing 16 having the desired number of tips 82 of a size to produce a filament with an intended diameter. Molten glass in the range of 2200° F. is flowed in the forehearth 14 and the electric heating elements 50 of the conduits 12 are supplied with power to maintain the desired glass temperature. The temperature is sensed by the thermocouples and suitable controls are provided to maintain the glass temperature at the desired valve. Electric power is supplied to the bushing tip plate 74 in any well known manner and the glass which is delivered by the modular molten glass column 10 to the tip plate 74 at an elevated pressure is formed through the tips 82 as glass fiber filaments. The modular glass conduits 12 are well insulated and can maintain the glass at a desired temperature with an expenditure of one-tenth or less of the energy required by an open gas or oil fired channel carrying the same volume of glass.

While the present invention has been described in terms of a vertical modular molten glass column, the modular glass conduits could also be joined together to form a horizontal, elongated pipe which would carry glass from a melter to a plurality of such glass columns 10. Depending on the distance to be traveled, the molten glass could be caused to flow by a pressure head at the melter, by slightly inclining the conduits or by the use of a pump or the like. In this way, the heat required would be reduced even further since the open channel forehearth would be replaced with a closed, well insulated pipe that the glass would flow through at an elevated temperature.

While a preferred embodiment of a modular molten glass column in accordance with the present invention has been hereinabove fully and completely described, it will be obvious to one of ordinary skill in the art that a number of changes in, for example, the dimensions of the conduits, the specific materials used, the type of heating means used, the structure of the forehearth and bushing and the structure of the fin cooler could be made without departing from the true spirit and scope of the invention and that accordingly, the invention is to be limited only by the following claims:

I claim:

1. A modular glass column for transferring molten glass from a molten glass source to a point of use, said column comprising at least a first and second modular glass conduit, each of said conduits having a molten glass conveying tube, a ceramic liner surrounding said molten glass conveying tube, heating means secured to said ceramic liner, means to control said heating means, a refractory liner surrounding said ceramic liner and an outside housing covering the refractory liner, means to join the first ends of each of the modular glass conduits to each other to provide fluid communication with the said conveying tubes of each of said conduits and means to join the second ends of said conduits to a molten glass source and a point use respectively.

2. The modular molten glass column of claim 1 wherein each of said ceramic liners is semi-cylindrical.

3. The modular molten glass column of claim 2 wherein each of said castable refractory liners is semi-cylindrical.

4. The modular molten glass column of claim 3 wherein each of said outer housings is semi-cylindrical.

5. The modular molten glass column of claim 1 wherein each of said heating means is a serpentine electric resistance heating element, each of said heating elements being semi-cylindrical.

6. The modular molten glass column of claim 1 wherein said source of supply of said molten glass is a forehearth.

7. The modular molten glass column of claims 1 or 6 wherein said point of use of said molten glass is a high pressure glass fiber forming bushing.

8. The modular molten glass column of claim 1 wherein said column is positioned vertically to transfer said molten glass to said point of use at a high pressure.

9. The modular molten glass column of claim 8 wherein said point of use is a high pressure glass fiber forming bushing.

10. A modular molten glass column for receiving molten glass from a forehearth and to supply the glass to a high pressure glass fiber forming bushing, said column delivering said molten glass to said bushing at high temperatures and pressure, said column comprising at least a first and a second glass modular glass conduit, each of said conduits having a molten glass conveying tube, a ceramic liner surrounding said molten glass conveying tube, heating means secured to said ceramic liner, means to control said heating means, a refractory surrounding said ceramic liner and an outer housing covering the refractory, means to join the first ends of the modular glass conduits to each other to provide fluid communication with the said conduits to said forehearth and said bushing respectively.

11. The column of claim 10 wherein each said central glass tube is surrounded by cooperating semi-cylindrical ceramic liners.

12. The column of claim 11 wherein electric resistance heating means are secured to each said ceramic liner.

13. The column of claim 10 wherein said insulating means includes cooperating semi-cylindrical liners of castable refractory.

14. The column of claim 10 wherein each of said conduits includes a pair of cooperating semi-cylindrial outer housing members.

15. The column of claim 14 wherein each of said housing members includes outer fins.

16. The column of claim 14 wherein each of said housing members includes flange elements at said first and second ends of said conduit.

* * * * *